June 6, 1933. T. H. CLOKE 1,912,824
DIRECTION INDICATOR SWITCH
Filed Dec. 12, 1928

Inventor
Thomas H. Cloke
by Otto M. Nerwich
Atty.

Patented June 6, 1933

1,912,824

UNITED STATES PATENT OFFICE

THOMAS H. CLOKE, OF PARK RIDGE, ILLINOIS

DIRECTION INDICATOR SWITCH

Application filed December 12, 1928. Serial No. 325,520.

The invention relates to a direction indicator or signalling device for signalling or indicating the direction in which a vehicle such as an automobile is about to turn.

The invention has as one of its principal objects the provision of a simple and inexpensive mechanism whereby a signal may be operated to indicate the direction in which the turn is to be made prior to the accomplishment of the turn, the mechanism being automatically operable after the change of direction is accomplished to restore the mechanism to a position from which it may be subsequently actuated to again indicate a change of direction.

An additional object of the invention is the provision of a unitary device which may be readily installed for use and located in proximity to the steering wheel where it is readily accessible to be set by the driver of the vehicle to indicate or signal a change of direction and to employ an element providing means associated with the steering wheel for restoring the device to a position from which it may be again manually operated to create a signal.

It is also an object of the invention to provide means for accomplishing the above and other objects, which means permits the steering wheel to be rotated without actuating the signalling device so that the signalling device will be engaged and actuated by the steering apparatus only when set to accomplish the signalling of a change of directions.

The invention has these and other objects, all of which will be explained in detail and more readily understood when read in conjunction with the accompanying drawing which illustrates one embodiment of which the invention is susceptible, it being obvious that changes and modifications may be resorted to without departing from the spirit of the appended claims.

In the drawing

Figure 1:
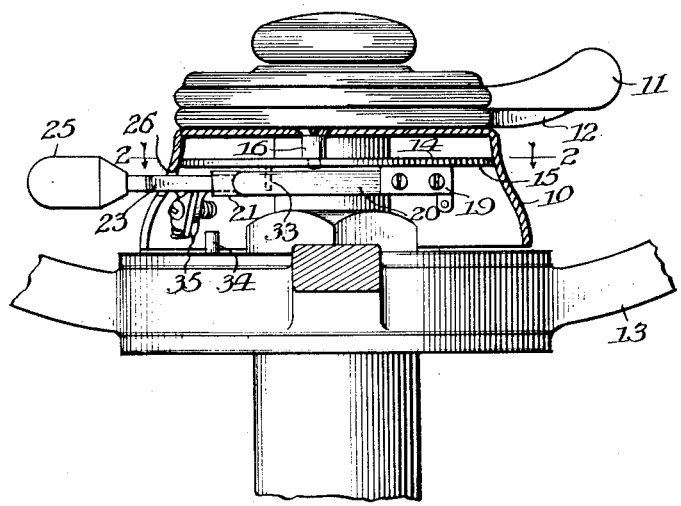
Fig. 1 is a view of the upper end of a steering apparatus having a steering wheel, etc., applied thereto, showing the device in position for use.
Figure 2:
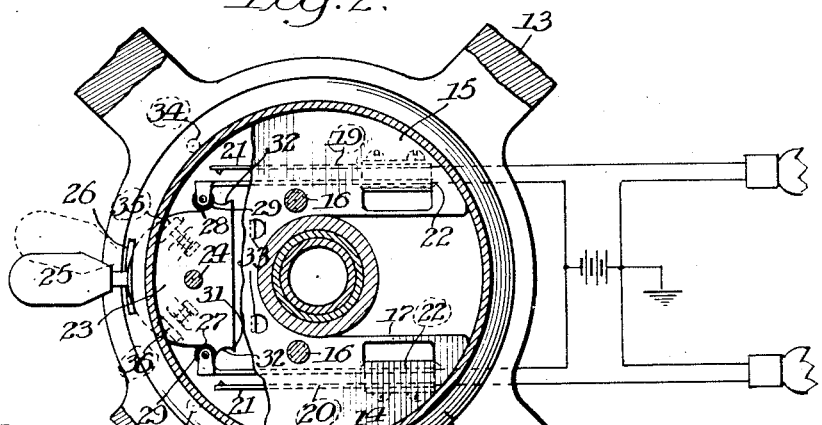
Fig. 2 is a sectional view on line 2—2 of Fig. 1, showing certain parts broken away for the purpose of illustration.
Figures 3, 4:
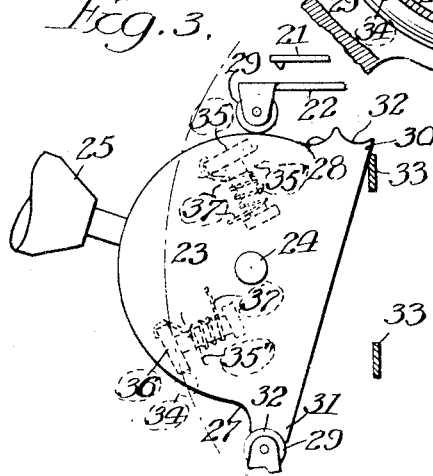
Fig. 3 is an enlarged view of a part shown in Fig. 2.
Fig. 4 is a front view of the element shown in Fig. 3.

The mechanism for accomplishing the various advantages is designed for association with the steering apparatus of an automobile and to be located adjacent the steering wheel and the spark and gas control levers, which, in the present practice, are arranged at the upper termination of the steering column above the steering wheel.

In the structure illustrated a cup-shaped housing 10 is employed which is stationarily mounted above the steering wheel and supports and separates the gas and spark control levers 11 and 12 from the steering wheel 13, it being understood that the spark and gas control levers are secured to rods which extend therefrom through the steering column to gas and spark control mechanism secured to said rods. This housing 10 provides a convenient means in which to house the mechanism generally designated 14, through which the various above enumerated and other objects may be accomplished. This mechanism, in the present construction, includes a supporting plate 15 which is designed to be arranged within the housing 10 and held stationarily relatively to said housing and other elements located at this end of the steering column by means of the shouldered screw-threaded members 16—16, which extend downwardly from the upper wall of said cup-shaped housing. This supporting plate may, as shown, be provided with the slot 17 whereby said plate may be conveniently arranged for support relatively to the steering post or shaft of the steering wheel. This plate is preferably supported in spaced relation to the upper face of the hub of the steering wheel to provide a space in which certain mechanism secured to this plate may operate and is arranged in this manner to position said mechanism so that it may co-operate with certain elements provided upon the steering wheel, which elements are employed to actuate the mechanism to extinguish the signals and also restore said mechanism to a position from which it may be manually operated to again actuate said signal.

This plate or support 15 is provided with switching elements which include the pairs of contact springs 19 and 20 located upon opposite sides of the opening 17 provided in the plate. These pairs of springs each include a spring such as 21, which is connected to one terminal of a lamp, the other spring, as 22, being grounded so that when these pairs of contacts engage each other, a circuit is completed which will illuminate a lamp respectively connected with each pair of these contacts. Contact between the springs of the respective pairs of springs is controlled through the medium of the switch element 23 which is arranged between the respective pairs of contact springs and is pivotally connected to the plate 17 at 24. This switch element has a handle 25 which projects through and operates in a slot 26 provided in the housing 10. The contact springs 22 engage with this switch element and said contact springs are actuated thereby to engage the respective contacts 21 to thus close the circuit to the lamps of the signal, which may be of either or both an audible or visible character. The body of the switch element is formed to provide the notches 27 and 28 with which the rollers 29 of the respective contact springs 22 cooperate to hold said switch members centralized. The body of the switch element 23 is further provided with a pair of projections 30 and 31 which project laterally from said body portion and are recessed at 32 to co-operate with the rollers 29 of the respective contact springs 22 to hold the body portion in a changed position when manually operated and to also close the circuit through the contacts of the respective pairs of contact springs. The support or plate 15 is provided with a pair of lugs 33 which project upwardly from the plate and into the path of the rotatable switch element 23 to limit the rotative movement of said switch element.

From the foregoing explanation of the structure thus far explained, it is manifest that manual movement of the switch element 23 in either direction laterally of the pivot 24 will cause one or the other of the projections 30 or 31 to close contact springs 22 and 21, depending upon the direction of movement of said switch element, which will close the circuit to one or the other of the signals or lamps connected with the respective pairs of contacts.

It is further evident that by virtue of the co-operation between the rollers 29 of the respective contact springs 22 and the recesses provided in said projections, said switch element is maintained in either of its changed positions. It is further manifest that these springs and rollers will, when the latter engage the notches 27 and 28 of the switch element, maintain the switch element in a central or neutral position in which the contact springs are open and the signal connected therewith inoperative.

The mechanism thus far explained provides a means for manually operating the signals to set either of them prior to the making of a turn to indicate the direction in which the vehicle is about to make a turn, it being understood that movement of the switch handle to the right or left will actuate a corresponding signal to indicate this.

As before stated, the device includes means for automatically actuating the switch element to cause the signals to be rendered inoperative after the turn or change of direction has been accomplished. This means includes means provided upon some suitable portion of the steering wheel or a part rotatable therewith, and in the present instance is provided through a pair of pins or projections 34, which extend upwardly from the hub of the steering wheel and are arranged upon opposite sides of the switch element 23. These pins or projections are provided to engage portions of the switch element 23 when said element is arranged in one of its above mentioned changed positions, and are arranged relatively to said switch element so that they may pass said switch element without interference when said switch element is arranged in an inoperative position, which thus allows freedom of rotation of the steering wheel without actuation of the switch element.

The switch element 23 is provided with a pair of yieldably mounted pawls, respectively, designated 35 and 36, which are yieldable toward each other, but however, are prevented against movement in the opposite direction, which will thus allow either of the pins 34 to ride over their respective pawls when the wheel is rotated in one direction and will engage its pawl to actuate said switch element when the wheel is rotated in the opposite direction which causes rotation of the switch element to restore said switch element to its normal position. These pawls are arranged upon the switch element and relatively to said pins 34 so that when the switch element is in a central or neutral position and the steering wheel is rotated, these pins will clear the pawls and not effect the switch element, thus allowing free rotation of the wheel. When the switch element 23 is moved upon its pivot either to the right or left to set the signal to indicate either a right or left turn, this switch element is releasably locked through said springs 22 and the recess 32. This rotative movement of the switch element arranges one or the other of the yieldable pawls in the path of rotation of its respective pin 34 and since these pawls are yieldable toward each other, that particular pawl which is arranged in the path of its particular pin will ride over the pawl when the steering wheel is rotated in the direction of the turn without effecting the switch element and will engage the pawl and actuate the switch to restore it to a neutral position or to a position in which neither direction signal is actuated when the wheel is turned in the opposite direction or turned to guide the vehicle in a straight course.

These pawls are pivotally connected to ears 35′ which project downwardly from the switch element 23 and said pawls are provided with a projection or stop 36′ which engages the face of the switch element to limit the movement of said pawls in one direction. Each of the pawls are provided with a coil spring 37 which permits the pawl to yield and to be restored.

From the foregoing description it is evident that should the driver desire to indicate that he is about to make a turn to either the right or left, all that he is required to do is to rotate the handle 25 in the direction of the turn. This movement in this direction will close either one or the other of the contacts 19 and 20 and ignite the lamp connected with the particular contact which is closed. This movement of the switch element also arranges one or the other of the yieldable pawls in the path of movement of one of the pins 34, which is by virtue of the yieldability of the pawl, allowed to ride over the pawl upon rotation of the steering wheel in the direction of the turn, and to be engaged by the pin to move the switch element 23 to break the contact between the springs of the contact, which was previously closed, which extinguishes the light.

From the foregoing description, it is manifest that a simple means is provided which is capable of arrangement adjacent the upper extremity of the steering post and steering wheel and which is manually operable to set the device to signal a turn which is automatically operable upon restoration of the steering mechanism to operate the car in a straight course to extinguish the signal should the signal be of a character such as a lamp.

It is also evident that the switch element 23 can be actuated manually to create and render the signal ineffective.

Having thus described my invention what I desire to claim by Letters Patent is:

1. In a device of the class described, the combination of a pair of switches, a member for actuating either one of said switches, an element movable in an arc of a circle for actuating said member, said member having means movable into and out of the path of movement of said element, said member being manually movable to arrange the means thereof in said path of movement of said element and being automatically movable by said element out of said path of said element, said member having an edge thereof provided with means for cooperating with said switches to close said switches and providing means for releasably holding said member in said last mentioned position.

2. In a device of the class described, the combination of a pair of switches, a member arranged in the plane of said switches and having an edge thereof provided with means for actuating either one of said switches, an element movable in an arc of a circle for actuating said member, said member having means arranged transverse to the plane thereof movable into and out of the path of movement of said element, said member being manually movable to arrange the means thereof in said path of movement of said element and being automatically movable by said element out of said path of said element, said member having means with which the switches cooperate to provide means for holding said switches in closed position.

3. In a device of the class described, the combination of a pair of switches, a pivoted member having the edge thereof provided with means for alternately actuating said switches and having said edge provided with a recess for receiving an element of said switches and cooperating with said switches to hold said pivoted member against rotation, an element movable in an arc of a circle for actuating said pivoted member, said pivoted member having means extending from a face thereof yieldable in opposite directions and movable into and out of the path of movement of said element, said pivoted member being manually movable to arrange the means thereof in said path of movement of said element and being automatically movable by said element out of said path of said element.

In witness whereof, I hereunto subscribe my name this 30th day of November, A. D. 1928.

THOMAS H. CLOKE.